Figures 1, 2, 3, 4:
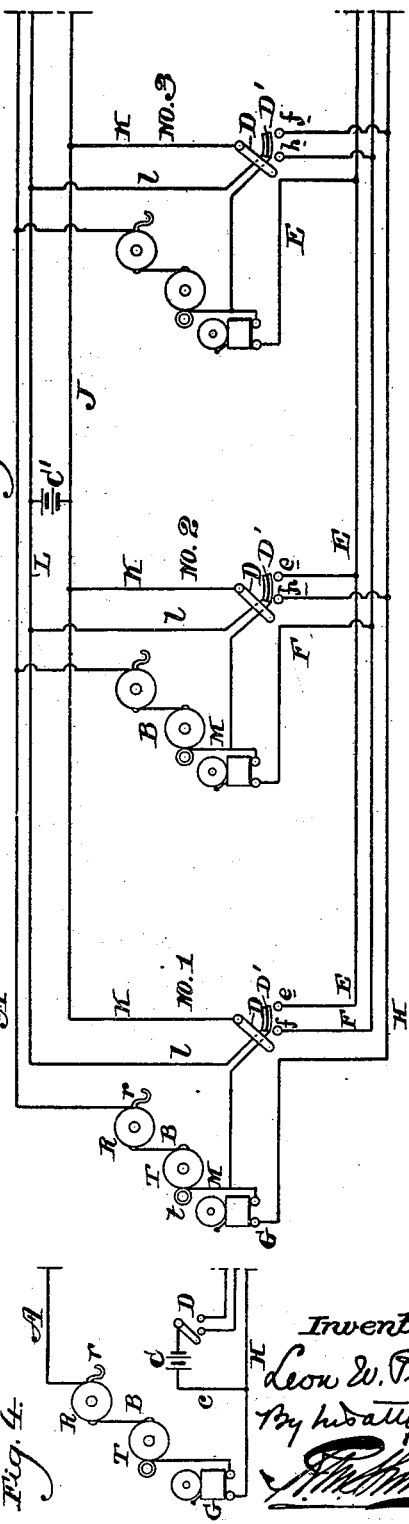

No. 665,548. Patented Jan. 8, 1901.
L. W. PULLEN.
TELEPHONIC SYSTEM.
(Application filed May 23, 1899.)
(No Model.)

Witnesses:
Inventor:
Leon W. Pullen

UNITED STATES PATENT OFFICE.

LEON W. PULLEN, OF CAMDEN, NEW JERSEY.

TELEPHONIC SYSTEM.

SPECIFICATION forming part of Letters Patent No. 665,548, dated January 8, 1901.

Application filed May 23, 1899. Serial No. 717,943. (No model.)

*To all whom it may concern:*

Be it known that I, LEON W. PULLEN, of the city and county of Camden, in the State of New Jersey, have invented an Improvement in Telephonic Systems, of which the following is a specification.

My invention has reference to telephonic systems; and it consists of certain improvements, all of which are fully set forth in the following specification and shown in the accompanying drawings, which form a part thereof.

The object of my invention is to provide a construction of wires and apparatus for telephonic communication between a number of subscribers which shall be simple, inexpensive, and productive of best results.

My object is, further, to adapt my improvements to a system of communication throughout a house or building and so arrange the operative portions thereof that there will be practically no opportunity of derangement from the carelessness of the operator or otherwise.

My invention will be better understood by reference to the accompanying drawings, in which—

Figure 1 is a diagram showing my improvements adapted to three sets of instruments and employing a separate battery at each of said sets of instruments. Fig. 2 is a similar diagram, but with the employment of a single or common battery for the several sets of instruments. Fig. 3 is a sectional elevation through the switches employed at each set of instruments, and Fig. 4 is a diagram showing a modified arrangement of the wires at one of the sets of instruments.

A is the main wire and connects with each of the receiving instruments R, which receivers may be of any of the well-known constructions.

T represents a series of transmitting instruments of any suitable construction, and one terminal of the transmitter of each set of instruments is connected with one terminal of the corresponding receiver by any suitable flexible conductor B. The other or outer terminal of each of the receivers is provided with a hook $r$, and the corresponding or outer terminal of the transmitter T of each of the sets is provided with an eye or suitable support $t$, into or upon which the hook may be placed, so as to sustain the receiver and at the same time to short-circuit the line A about the transmitter and receiver for reasons which will be explained hereinafter.

Each of the sets of instruments is provided with an ordinary electric bell G, one terminal of which connects by a wire M with the transmitter T at its ring-terminal $t$. The other terminals of the several bells G of the several sets of instruments, Nos. 1, 2, and 3, connect, respectively, with the signal-wires H, F, and E. The wire H, leading from instrument No. 1, has a contact-terminal $h$ at instruments Nos. 2 and 3. Wire E, leading from instrument No. 3, terminates in contacts $e$ at instruments Nos. 1 and 2. Wire F, leading from instrument No. 2, has terminals $f$ at each of the instruments Nos. 1 and 3.

D are switches arranged at each of the sets of instruments and are adapted to be moved over the contacts $e$, $f$, and $h$ to form a connection with the wire leading to the bell G of the instrument desired. C is a battery and is included in a conductor $c$ from the switch D to the wire M or one terminal of the bell G. A similar construction is employed at each of the sets of instruments.

It will now be understood that if the receivers are hung upon the transmitters, so as to be short-circuited, the movement of the switch D at any instrument upon the contact of the wire leading to the bell of the instrument to be called up or signaled, we will have the current passing from the battery C through the switch to the desired wire E, F, or H, thence to the bell, and thence by wires $m$, A, and N back to the battery at the instrument where the signal was sent from. When the signal has been made, the switch D is kept closed, and the parties to be in communication after lifting off the receivers may now freely talk over the wires. For example, if operator of No. 1 instrument wishes to talk to the party of No. 2 instrument he would move the switch D upon the contact $f$, and after the signal has been made at instrument No. 2 he removes the receiver R, and the same is done at instrument No. 2. The electric impulses now pass from battery C through wire M, transmitter, and receiver in series, thence by line A through the receiver and transmitter at instrument No. 2, and by wire M passes through the bell G, thence to wire F, and by switch D at instrument No. 1 returns again to battery C.

It is convenient to talk through the bell G, since it is of low resistance, possibly not more than three ohms. The receiver and transmitter at each of the stations introduce a resistance of approximately sixty ohms, and consequently as soon as they are introduced in series the bell at the station or instrument signaled will fail to operate, so that while it is in circuit it performs no objectionable results.

The switch D may be of any suitable construction but I prefer to make it a spring-switch adapted to be moved about a pivot D, as indicated in Fig. 3. In this manner the switch may be brought over either of the contacts and then pressed upon them to complete the circuit both for signaling and talking. The short-circuiting of the receiver and transmitter insures the signal operating, but when separated prevents the bell responding and permits conversation. In this manner if the person sending the message should leave the apparatus the switch D will automatically open and prevent derangement, which might otherwise interfere with a proper signaling from one of the other instruments.

The operator will invariably hang the receiver upon the transmitter, as otherwise the receiver would fall down; but there would be greater tendency to forget to open the switch, and consequently it is advisable to employ an automatic self-opening switch. When such a switch is employed, the only requirement of the operator at any instrument is to hang up the receiver, which he would invariably do.

If desired, the switch D may be an ordinary wire-closing switch; but in this case it is advisable to connect the battery C by wire c outside of the bell G of the sending instrument, because now the movement of the switch D would not only ring the bell at the distant instrument, but would also ring the bell at the sending-station. This is shown by the diagram Fig. 4. When the receiver is separated from the transmitter, the resistance introduced in the line A would prevent the bells ringing, as before. When conversation was through and the receivers hung up, the bell G at the sending-station would begin to ring, and thereby notify the operator that the switch D must be opened before he leaves the instrument. In this manner an ordinary switch D might be employed in place of using an automatic spring-switch without fear of material derangement of the apparatus by carelessness of the operator. I would, however, include double the bell-resistance in the talking-circuit, which is not desirable, though not a material defect.

In the foregoing constructions I have described my invention with reference to using a battery at each set of instruments; but it is quite evident that a single battery might be employed for all sets of instruments. The arrangement for this construction is shown in Fig. 2, which is the same as that shown in Fig. 1, with the exception that in place of the short battery-wires c, connecting the switch with the conductor M, I substitute the wires J L K l, which are equivalent to the wires c of Fig. 1, drawn out to meet at one place and act as common wires to a single battery, which in the present case is marked C'. The wires J and L are in this case made as line-wires parallel to the wires E, F, H, and A, and the short connecting-wires K l are branched off. In this manner the battery may be located in the cellar or some convenient place. As the using of a common battery C' would produce a short-circuiting of the telephones by the wires l at the different stations or instruments, I make these wires l normally open circuits, the open parts being provided with the contact bars or plates D' adjacent to the switches D. The switches D are also each provided with an insulated contact-plate $D^2$ on the under side, as shown in Fig. 4, and adapted to bridge the contact-plates D' when the switch-lever D at the sending-station is pressed down to make a signal or while talking. By this means all of the wires l, except at the sending or signaling station, are open, and normally all of these wires l are open. There is great advantage of the construction of Fig. 2 over that of Fig. 1, because it requires very much less battery elements and cheapens the cost of construction and maintenance. Any other suitable means for opening the wires l may be employed for that shown.

In practice the various wires A, E, F, and H are formed into a cable and extended throughout the building and at the proper places are tapped off to the respective instruments.

While I prefer the construction shown, the minor details thereof may be varied without departing from the spirit of the invention.

What I claim as new, and desire to secure by Letters Patent, is—

1. In a telephonic system the combination of a line-wire, two or more signal-wires and two or more sets of instruments each comprising a transmitter and a receiver connected in series in a local wire in circuit with the line-wire and provided with means to short-circuit them both while maintaining an electrical connection with the line-wire, a signal-bell connected on one side to the local wire and on the other side with one of the signal-wires and at all times in series with the transmitter and receiver, a source of electrical energy connecting with the local wire of the transmitter and receiver and between them and the other signal-wires, and a switch device for connecting the other terminal of the source of electrical energy with either of the said other signal-wires whereby any instrument may be put in electrical connection with any other instrument and create a signal when the receivers and transmitters are short-circuited and the bell always maintained in series with the receiving and transmitting instruments in the completed circuit.

2. The combination of the line-wire A and the signal-wires H, F, with a transmitter T, a receiver R and signal-bell G connected in series between the line-wire A and the signal-wire H, a similar distant set of transmitter receiver and signal-bell connected between the line-wire A and the signal-wire F, and switches D, D for electrically connecting the wires H and F with the transmitters and receivers and including them in series with a source of electrical energy and the bells said switches being self-opening switches adapted to be closed only by the application of manual pressure.

3. In a telephonic system, the combination of a talking or line wire, two or more stations with a signal-wire extending between them, means for supplying current to the talking and signal wire, a signal-bell of low resistance permanently in circuit between the signal-wire and line-wire at each of the stations, a receiver and a transmitter of relatively high resistance connected in series with the bell between the talking or line wire and the signal-wire at each of the stations, and suitable means for independently short-circuiting the transmitter and receiver at each station while maintaining them in series with the bell whereby the resistance of these instruments shall be eliminated from the wire when signaling.

4. In a telephonic system for communication between several distant places, the combination of a line-wire and two battery-wires extending between all of the several sets of telephonic instruments, a single battery or source of electrical energy having its terminals connected to said battery-wires, two or more signal-wires also extending between the several sets of telephonic instruments, two or more sets of instruments each comprising a transmitter and a receiver connected in series in a local wire in circuit with the line-wire and provided with means to short-circuit them while maintaining an electrical connection with the line-wire, a signal-bell connected on one side to the local wire and on the other side with one of the signal-wires and at all times in series with the transmitter and receiver, an electrical connection between one of the battery-wires and the several telephonic instruments and between them and the signal-wires, a switch device for connecting the other battery-wire with either of the other signal-wires, whereby any instrument may be put in electrical connection with any other instrument and create a signal when the receivers and transmitters are short-circuited, and an automatic switch device for normally interrupting the first-mentioned battery-wire whereby the battery is normally open-circuited.

5. In a telephonic system, the combination of a line-wire, two battery-wires and two or more signal-wires extending between all of the sets of instruments, a source of electric energy between the two battery-wires, a series of talking and signaling instruments each consisting of telephonic transmitting and receiving devices connected on one side with the line-wire and on the other side with one of the signal-wires, an electric bell also connecting with one of the signal-wires, means for short-circuiting the transmitter and receiver devices, an electrical connection between one of the battery-wires and each of the transmitting instruments on the side most distant from their connection with the line-wire, a switch to open or close this connection at will, and switching devices for connecting the other battery-wire with either of the remaining signal-wires, all substantially as set out.

In testimony of which invention I have hereunto set my hand.

LEON W. PULLEN.

Witnesses:
D. W. HOLLOWAY,
J. W. KENWORTHY.